United States Patent
Kulkarni et al.

(10) Patent No.: US 12,537,793 B2
(45) Date of Patent: Jan. 27, 2026

(54) DISCOVERING OWNERSHIP ASSIGNMENT OF COMPUTER DEVICES IN A TELECOMMUNICATIONS NETWORK

(71) Applicant: T-Mobile USA, Inc., Bellevue, WA (US)

(72) Inventors: Raghavendra Kulkarni, Redmond, WA (US); Sudhanshu Pandey, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 20 days.

(21) Appl. No.: 18/757,234

(22) Filed: Jun. 27, 2024

(65) Prior Publication Data

US 2026/0006000 A1    Jan. 1, 2026

(51) Int. Cl.
*H04L 61/5076* (2022.01)
*H04L 61/5007* (2022.01)

(52) U.S. Cl.
CPC ...... *H04L 61/5076* (2022.05); *H04L 61/5007* (2022.05)

(58) Field of Classification Search
CPC ............. H04L 61/5076; H04L 61/5007; H04L 61/5061
USPC ........................................................ 709/245
See application file for complete search history.

(56) References Cited

U.S. PATENT DOCUMENTS

| | | | |
|---|---|---|---|
| 6,651,100 B2 | 11/2003 | Bush et al. | |
| 6,993,583 B2 | 1/2006 | Anderson et al. | |
| 6,996,617 B1 | 2/2006 | Aiken et al. | |
| 7,065,092 B2 | 6/2006 | Chen et al. | |
| 7,197,549 B1 | 3/2007 | Salama et al. | |
| 7,286,537 B2 | 10/2007 | Roh | |
| 7,580,422 B2 | 8/2009 | Gu et al. | |
| 7,693,163 B2 | 4/2010 | Choo et al. | |
| 7,720,996 B2 | 5/2010 | Soles et al. | |
| 7,788,345 B1 | 8/2010 | Sukiman et al. | |
| 7,843,903 B2 | 11/2010 | Bakke et al. | |
| 8,064,875 B2 | 11/2011 | Velazquez et al. | |
| 8,161,190 B2 | 4/2012 | Ringen | |

(Continued)

FOREIGN PATENT DOCUMENTS

CN       1777194 A  *  5/2006
CN     107864230 B     8/2020

(Continued)

*Primary Examiner* — Ruolei Zong

(74) *Attorney, Agent, or Firm* — Perkins Coie LLP

(57) ABSTRACT

A method for discovering ownership assignment of computer devices includes obtaining a set of unassigned internet protocol (IP) addresses. The multiple computer devices are assigned to multiple teams of an organization such that each team is assigned to a segment of the sequence of IP addresses. The method includes converting each IP address into a numerical value. The method includes obtaining a set of assigned IP addresses from an assigned IP address database and obtaining a subnet allocation for each IP address in the set of assigned IP addresses. For a particular unassigned IP address, the method includes a reference IP address from the set of assigned IP addresses and determining whether the particular IP address and the reference IP address have a same subnet allocation. The method includes determining the ownership assignment based on the subnet allocation.

20 Claims, 4 Drawing Sheets

(56) References Cited

U.S. PATENT DOCUMENTS

| | | | |
|---|---|---|---|
| 8,223,631 | B2 | 7/2012 | Yasrebi et al. |
| 8,429,257 | B2 | 4/2013 | Ait-Ameur et al. |
| 8,483,374 | B1 | 7/2013 | Tonogai et al. |
| 8,775,629 | B1 | 7/2014 | Whittle |
| 9,813,309 | B2 | 11/2017 | Li et al. |
| 10,924,449 | B2 | 2/2021 | Ranta |
| 10,924,503 | B1* | 2/2021 | Pereira ............... H04L 63/20 |
| 11,025,587 | B2 | 6/2021 | Andrew et al. |
| 11,909,719 | B1 | 2/2024 | Kramer et al. |
| 2002/0143946 | A1 | 10/2002 | Crosson |
| 2003/0056008 | A1 | 3/2003 | Russell et al. |
| 2006/0039386 | A1 | 2/2006 | Park |
| 2008/0294732 | A1* | 11/2008 | Fletcher ............... H04L 67/54 709/227 |
| 2008/0304487 | A1 | 12/2008 | Kotecha |
| 2009/0248790 | A1 | 10/2009 | Webb-Johnson |
| 2010/0023593 | A1* | 1/2010 | Matsuo ............ G06F 16/1837 709/245 |
| 2010/0161771 | A1 | 6/2010 | Wang et al. |
| 2011/0185049 | A1 | 7/2011 | Atreya et al. |
| 2013/0182651 | A1 | 7/2013 | Kelkar et al. |
| 2015/0312212 | A1* | 10/2015 | Holmes ............... H04L 61/5007 709/245 |
| 2016/0330245 | A1* | 11/2016 | Bell ................... H04L 63/0823 |
| 2023/0042307 | A1* | 2/2023 | Milton ............... H04L 61/5076 |
| 2023/0420147 | A1* | 12/2023 | Baker ............... H04L 61/4511 |
| 2024/0163271 | A1* | 5/2024 | Krishan ............... H04L 9/3213 |

FOREIGN PATENT DOCUMENTS

| | | |
|---|---|---|
| CN | 107404544 B | 10/2020 |
| CN | 108228834 B | 12/2022 |
| EP | 3425885 A1 | 1/2019 |
| JP | 2015128282 A | 7/2015 |
| KR | 100601697 B1 | 7/2006 |
| KR | 100625240 B1 | 9/2006 |
| WO | 2010121495 A1 | 10/2010 |
| WO | 2015192583 A1 | 12/2015 |
| WO | 2018150222 A1 | 8/2018 |
| WO | 2018235085 A1 | 12/2018 |

* cited by examiner

DISCOVERING OWNERSHIP ASSIGNMENT OF COMPUTER DEVICES IN A TELECOMMUNICATIONS NETWORK

BACKGROUND

Comprehensive knowledge of computer device owners, including Internet Protocol (IP) addresses and their respective owners, is important for organizations for security purposes. This information plays a vital role in effectively managing devices in the organization and addressing vulnerabilities such as ransomware conditions and port exposures. In large organizations, numerous devices are connected to different types of networks, making it challenging to track and assign ownership to each IP address. With the increasing adoption of private cloud environments, utilizing Kubernetes-based containerized platforms or virtual machines, a significant number of IP addresses can be generated overnight. Instantaneously identifying the owner of these newly spawned IP addresses becomes a complex task, thereby compromising security compliance and increasing the risk of potential security breaches.

BRIEF DESCRIPTION OF THE DRAWINGS

Detailed descriptions of implementations of the present invention will be described and explained through the use of the accompanying drawings.

Figure 1:
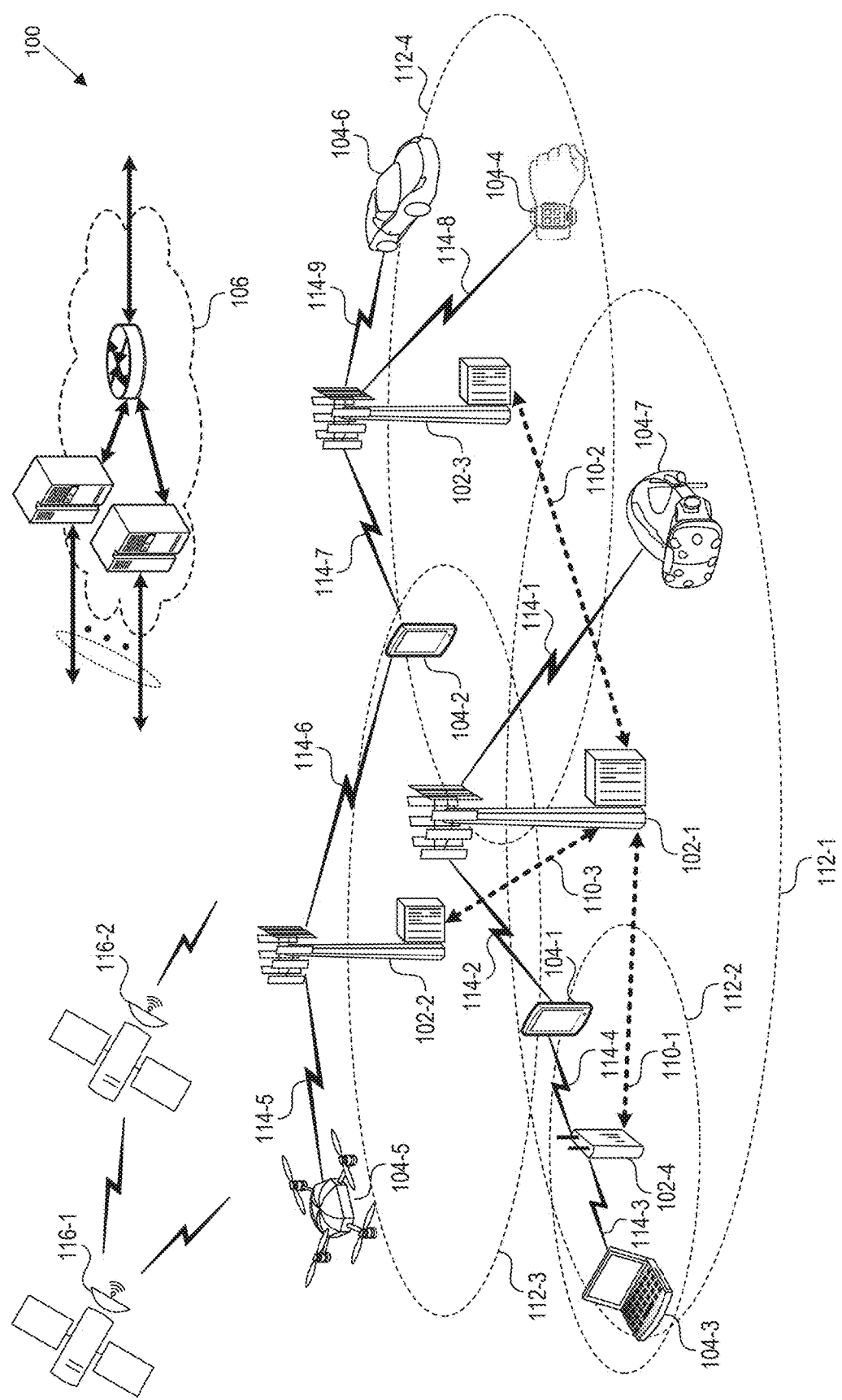
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides methods and systems for discovering the ownership of computer devices in a network based on IP addresses associated with the computer devices. Having a comprehensive knowledge of ownership assignment of computer devices is important for an organization to manage the devices as well as to increase the security of the organization. Devices can be originally assigned to users or teams of an organization based on their IP addresses. For example, a particular team is provided with a segment of sequential IP addresses (e.g., a segment of 10, 50, 100, or more IP addresses). However, over time the organizations tend to lose track of the ownership as devices are removed from use, users of the devices change teams or leave the organizations, old devices are replaced with new devices, etc. Often organizations end up with a significant amount of IP addresses that have an unknown ownership assignment.

The present technology provides for an automated method of assignment of the ownership of devices with unknown ownership in an efficient and reliable manner. The method utilizes the properties of an IP address, in particular the numeric value of IP addresses and subnet range associated with the IP addresses, to discover appropriate reference IP addresses having known ownership assignments. The method can enable an organization to significantly decrease the number of IP addresses with unknown ownership assignment, thereby improving the overall network security associated with the organization.

In one example, a method for discovering ownership assignment of computer devices associated with a telecommunications network includes obtaining a set of unassigned internet protocol (IP) addresses for ownership assignment discovery. Each IP address in the set of unassigned IP addresses can be associated with a computer device of multiple computer devices on the telecommunications network. Each IP address in the set of unassigned IP addresses can be from a sequence of IP addresses associated with an organization. The multiple computer devices can be assigned to multiple teams of the organization such that each team in the multiple teams is assigned to a segment of the sequence of IP addresses. The ownership assignment of the set of IP addresses can be unknown. The method can include converting each IP address in the set of unassigned IP addresses into a numerical value representative of the respective IP address and obtaining a set of assigned IP addresses from an assigned IP address database. The ownership assignment of the set of assigned IP addresses can be known. The method can include obtaining a subnet allocation for each IP address in the set of assigned IP addresses from a subnet allocation database. For a particular IP address of the set of unassigned IP addresses, the method can include determining a reference IP address from the set of assigned IP addresses by determining a shortest absolute distance between a numerical value associated with the particular IP address and a numerical value associated with the reference IP address. The method can include determining whether the particular IP address and the reference IP address have a same subnet allocation. Responsive to a determination that the particular IP address and the reference IP address have the same subnet allocation, the method can include determining that the ownership assignment of the particular IP address is the same as the ownership assignment of the reference IP address.

In another example, a method includes obtaining a set of unassigned IP addresses for ownership assignment discovery. Each IP address in the set of unassigned IP addresses can be associated with a computer device of multiple computer devices on the telecommunications network. Each IP address in the set of unassigned IP addresses can be from a sequence of IP addresses associated with an organization. The method can include converting each IP address in the set of unassigned IP addresses into a numerical value representative of the respective IP address. The method can include obtaining a set of assigned IP addresses from an assigned IP address database. The method can include obtaining a subnet allocation for each IP address in the set of assigned IP addresses from a subnet allocation database. For a particular IP address of the set of unassigned IP addresses, the method can include determining a reference IP address from the set of assigned IP addresses based on a numerical value associated with the particular IP address and a numerical value associated with the reference IP address. The method can include determining whether the particular IP address and the reference IP address have a same subnet allocation. Responsive to a determination that the particular IP address and the reference IP address have the same subnet allocation, the method can include determining that the ownership assignment of the particular IP address is the same as the ownership assignment of the reference IP address.

In yet another example, a non-transitory, computer-readable storage medium includes instructions for causing the device to obtain a set of unassigned IP addresses for ownership assignment discovery. Each IP address in the set of unassigned IP addresses can be associated with a computer device of multiple computer devices on the telecommunications network. Each IP address in the set of unassigned IP addresses can be from a sequence of IP addresses associated with an organization. The device can convert each IP address in the set of unassigned IP addresses into a numerical value representative of the respective IP address. The device can obtain a set of assigned IP addresses from an assigned IP address database. The device can obtain a subnet allocation for each IP address in the set of assigned IP addresses from a subnet allocation database. For a particular IP address of the set of unassigned IP addresses, the device can determine a reference IP address from the set of assigned IP addresses based on a numerical value associated with the particular IP address and a numerical value associated with the reference IP address. The device can determine whether the particular IP address and the reference IP address have a same subnet allocation. Responsive to a determination that the particular IP address and the reference IP address have the same subnet allocation, the device can determine that the ownership assignment of the particular IP address is the same as the ownership assignment of the reference IP address.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Ownership Assignment Discovery

Figure 2:
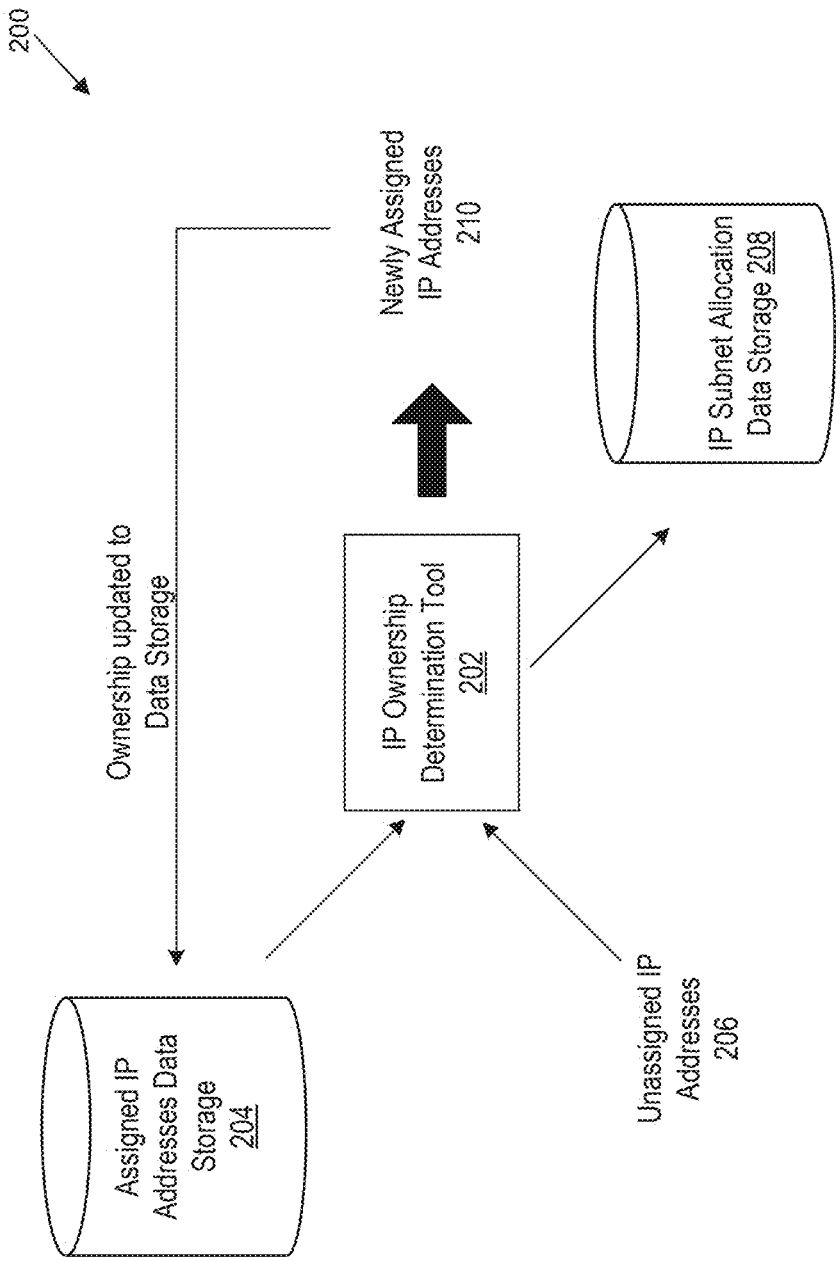
FIG. 2 is a schematic illustration of a system for discovering ownership assignment of computer devices.

FIG. 2 is a schematic illustration of a system 200 for discovering ownership assignment of computer devices. The system 200 includes an IP ownership determination tool (IPOD) 202 (e.g., a software program operating on a computer device), an IP subnet allocation data storage (or database) 208, and an assigned IP addresses data storage 204. The IPOD 202 is in communication with the IP subnet allocation data storage 208 and the assigned IP addresses data storage 204 and is configured to transmit data to, and retrieve data from, these data storages.

The assigned ownership data storage 204 includes information regarding IP assets of an organization. The IP assets can be computer devices that are configured to communicate via the internet and are associated with IP addresses. Each IP asset is associated with at least one IP address. The assigned IP addresses data storage 204 includes information of IP assets having known ownership. For example, the information can include an IP address and an identification of the owner of a particular computer device (e.g., a laptop, personal computer, tablet computer, mobile phone, or other computer device) belonging to an organization. The owner can refer to a user (e.g., an individual such as an employee of an organization) or a team within an organization (e.g., a team or a group associated with a company). The ownership can be assigned based on the function or operation of different teams, geographical locations of the teams, network requirements of the teams, or any other criteria. The information can include data that correlates ownership of each of the IP assets in the data storage with a respective IP address.

The IP subnet allocation data storage 208 includes information regarding the allocation of portions of a network within an organization. A larger IP network (e.g., all or a portion of a network associated with an organization) can be divided into smaller sub-networks (subnets). The division can help an organization to segment the network. The subnet division can also allow an organization to manage IP addresses in a network. For example, an organization allocates different subnets of a larger IP network to different teams or groups of the organization.

IP addresses are generally expressed in a dotted-decimal notation (for IPV4) or hexadecimal notation (for IPV6). On the IP address level, dividing the larger IP network into subnets includes borrowing bits from the host portion to create additional network addresses. An IP address includes a network portion and a host portion. A subnet mask determines how an IP address is divided into these two parts. For example, a subnet mask 255.255.255.0 means the first 24 bits correspond to the network portion and the remaining 8 bits correspond to the hosts. As another example, in accordance with Classless Inter-Domain Routing (CIDR) notation, a subnet mask in 192.168.1.0/24 indicates a network with 256 addresses out of which 254 are for the host, one for the network address, and one for the broadcast address. The subnet mask can provide the number of subnets and host addresses per each subnet that is required or desired by an organization. Each subnet includes a range of IP addresses. For example, a 192.168.1.0/24 network, divided into/26 subnets produces four subnets (192.168.1.0/26, 192.168.1.64/26, 192.168.1.128/26, 192.168.1.192/26).

In order to manage the IP assets, an organization can allocate subnets of the larger network into different teams and groups of the organization. The organization can further assign particular IP addresses to the teams or groups. For example, a team is assigned a segment of sequential IP addresses. The team might use all or a portion of the IP addresses that are assigned to it. IP assets can be assigned to or unassigned from the segment of IP addresses at different times. For example, if a team acquires a new laptop, the laptop can be assigned to an IP address from the segment associated with the team. Similarly, if a laptop gets broken, the IP address can be unassigned from that broken laptop.

The IPOD 202 is configured to utilize information stored at the assigned IP addresses data storage 204 and the IP subnet allocation data storage 208 to discover ownership assignment for such IP addresses within the organization that have unknown ownership (e.g., an unassigned IP address 206). The IPOD 202 can be configured to receive the unassigned IP address 206 (e.g., from data storage). The IPOD 202 can process the unassigned IP address 206 by converting the decimal format IP addresses into numerical value. The numerical format can be a numerical value, a decimal value, or other numerical value. A numerical format can facilitate the use of computational operations on the IP addresses to, for example, compare different IP addresses to each other. The IPOD 202 can compare the unassigned IP address 206 to assigned IP addresses received from the assigned IP addresses data storage 204 in the numeric format. Based on the comparison, the IPOD 202 can determine, for each unassigned IP address, a reference IP address from among the assigned IP addresses data storage 204. For example, the reference IP address can be an assigned IP address having the closest similarity (e.g., shortest distance) to an unassigned IP address. In other words, there is a likelihood that the ownership assignment of the unassigned IP address is the same as the ownership assignment of the reference IP address. The IPOD 202 can further use information from the IP subnet allocation data storage 208 to determine whether the reference IP address and the unassigned IP address have the same subnet allocation. In an instance where the reference IP address and the unassigned IP address have the same subnet allocation, the IPOD 202 can determine that the reference IP address and the unassigned IP address have the same ownership assignment. In such instances, the IPOD 202 stores the unassigned IP address as a newly assigned IP address 210 and stores the newly assigned IP address 210 to the assigned IP addresses data storage 204.

The system 200 is configured to discover ownership assignments accurately and efficiently for a large number of unassigned IP addresses. For example, a large organization can include hundreds or thousands of unassigned IP addresses that can cause a security threat to the organization. The system 200 can thereby improve the security of the network associated with an organization by efficiently discovering ownership assignment of computer devices within the organization.

Figure 3:
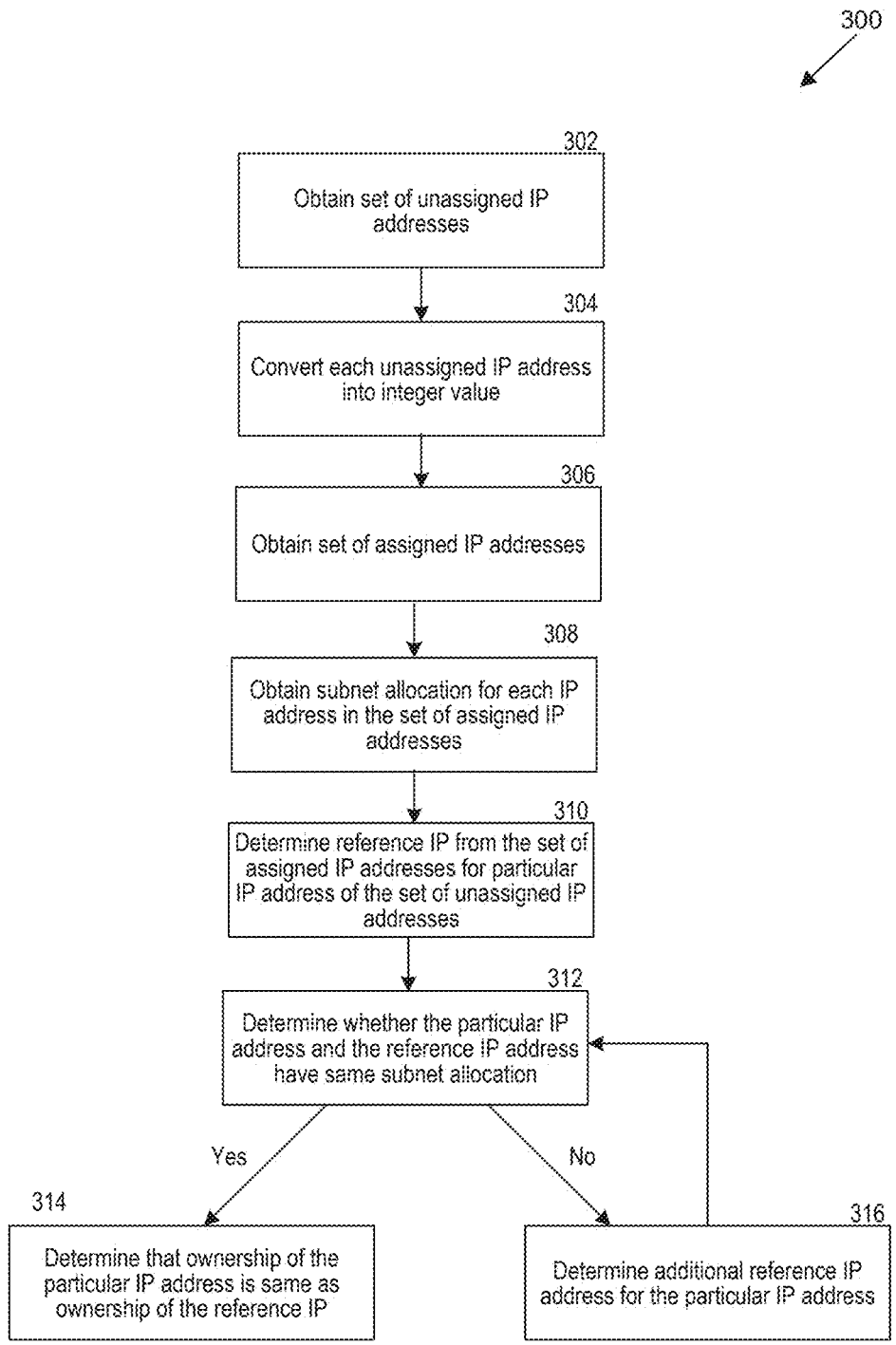
FIG. 3 is a flowchart illustrating processes for discovering ownership assignment of computer devices in a network.

FIG. 3 is a flow diagram that illustrates processes 300 for discovering ownership assignment of computer devices in a telecommunications network. The processes 300 can be performed by a computer device (e.g., a computer system 400 in FIG. 4) including a software program for performing the processes 300 (e.g., the IPOD 202 in FIG. 2). The ownership assignment is associated with devices in communication with a wireless network (e.g., the wireless network 100 in FIG. 1). The device can include at least one hardware processor and at least one non-transitory memory storing instructions. When the instructions are executed by the at least one hardware processor, the device performs the processes 300.

The processes 300 are directed to discovering ownership of unassigned IP addresses within an organization. Discovering ownership of the unassigned IP addresses includes processing the unassigned IP addresses in a format that facilitates forming computational operations that allow analyzing of the unassigned IP addresses based on assigned (e.g., having known ownership) IP addresses and subnet allocations.

At 302, the device (e.g., a device including the IPOD 202 in FIG. 2) can obtain a set of unassigned IP addresses (e.g., the unassigned IP addresses 206) for ownership assignment discovery. The ownership assignment of the set of IP addresses can be unknown.

Each IP address in the set of unassigned IP addresses can be associated with a computer device of multiple computer devices on the telecommunications network. The computer devices can include any devices that connect to a network that uses IP for communication. In some implementations, the multiple computer devices include electronic devices, server devices, and/or cloud servers in communication with the telecommunications network. The electronic devices can include computers (e.g., desktop, laptop, server, and/or tablet computers), mobile phones, wearable devices (e.g., smart watches), IoT devices, printers, gaming consoles, televisions, voice over IP (VOIP) phones, network storage devices, media streamers, etc. For example, each IP address in the set of unassigned IP addresses is associated with at least one application programming interface of a respective computer device of the multiple computer devices on the telecommunications network.

Each IP address in the set of unassigned IP addresses can be from a sequence of IP addresses associated with an organization. The multiple computer devices can be assigned to multiple teams (and/or individuals or a combination thereof) of the organization such that each team in the multiple teams is assigned to a segment of the sequence of IP addresses. For example, an organization can initially assign IP addresses to its teams so that each team is assigned to a segment of IP addresses from a sequential list of IP addresses. A segment can include any number (1,2,4,8,16, 32,64,128,256,512, etc.) of IP addresses (e.g., a team is assigned to IP addresses ranging from 10.147.50.0 through 10.147.50.63). Each team is also assigned to a subnet range of the network associated with the organization.

The set of unassigned IP addresses can correspond to IP addresses that were originally assigned to a team, but the ownership assignment information has been lost during the course of the time. The assignment information can be lost, for example, due to changes such as teams being closed or their position in the organization being changed, individuals leaving the organization, IP assets being reassigned to different teams, IP assets being removed or replaced within the organization, or other reasons.

At 304, the device can convert each unassigned IP address in the set of unassigned IP addresses into a numerical value (e.g., an integer value or a decimal value) representative of the respective IP address. In some implementations, converting each IP address in the set of unassigned IP addresses into a numerical value includes converting each of the IP addresses into a binary representation, concatenating the binary representation into a binary string, and converting the binary string into the numeric.

At 306, the device can obtain a set of assigned IP addresses from an assigned IP address database (e.g., from the assigned IP addresses data storage 204 in FIG. 2). The ownership assignments of the set of assigned IP addresses are known.

At 308, the device can obtain a subnet allocation for each IP address in the set of assigned IP addresses from a subnet allocation database (e.g., the IP subnet allocation data storage 208 in FIG. 2). In some implementations, the subnet allocation database stores ownership information for the IP addresses associated with the telecommunications network. The information can be stored at the time when an organization has assigned IP addresses to the different teams. The subnet allocation can be based on segments of the sequence of IP addresses assigned to the multiple teams.

In some implementations, obtaining the subnet allocation for each IP address in the set of assigned IP addresses includes determining a subnet mask for each of the IP addresses based on a network class (e.g., classes A, B, C) or a network scheme (e.g., subnetting) associated with the telecommunications network. The device can determine a subnet for each of the IP addresses based on the determined subnet mask and the respective IP address. For example, subnet masks are involved in the creation and assignment of IP addresses within the organization. The organization can determine a subnet mask allocation for a team based on the number of required subnets and hosts and assign an IP address range based on the subnet mask.

At 310, the device can determine a reference IP address from the set of assigned IP addresses for a particular IP address of the set of unassigned IP addresses. The determination can include determining a shortest absolute distance between a numerical value associated with the particular IP address and a numerical value associated with the reference IP address. For example, the device converts the set of assigned IP addresses into respective integer values and calculates the distances between the numeric value corresponding to the particular unassigned IP address and the numeric values of the set of assigned IP addresses.

At 312, the device can determine whether the particular IP address and the reference IP address have a same subnet allocation. In some instances, when the particular IP address is at or near a borderline of the assigned IP address segments, the reference IP address can in fact be assigned to a different team than the particular IP address. Therefore, in order to verify that the ownership assignment is correct, the device further determines whether the particular IP address and the reference address have the same subnet allocation. Such two-step ownership assignment determination increases the reliability and accuracy of the ownership assignment.

In some implementations, determining whether the particular IP address and the reference IP address have the same subnet allocation includes determining a subnet mask for the particular IP address based on a network class or a network scheme associated with the telecommunications network. Determining the subnet mask can also include determining a subnet for the particular IP address based on the determined subnet mask and the particular IP address.

At 314, responsive to a determination that the particular IP address and the reference IP address have the same subnet allocation, the device can determine that the ownership assignment of the particular IP address is the same as the ownership assignment of the reference IP address. For example, the device determines that a computer device of the multiple computer devices is assigned to a same team of the organization as the reference IP address.

In some implementations, responsive to determining the ownership assignment of the particular IP address, the device can store the assigned ownership assignment and the particular IP address in the assigned IP address database. For example, as described with respect to FIG. 2, the IPOD 202 stores the newly assigned IP addresses 210 to the assigned IP addresses data storage 204.

At 316, responsive to a determination that the particular IP address and the reference IP address do not have the same subnet allocation, the device can determine an additional reference IP address from the set of assigned IP addresses. For example, if the particular IP address and the reference IP address do not have the same subnet allocation, the device can determine that the ownership assignment of the particular IP address cannot be the same as the ownership assignment of the reference IP address. In such instances, the device determines the additional reference IP address that is different from the reference IP address. The additional reference IP address can be determined by determining a second shortest absolute distance between the numeric value associated with the particular IP address and a numerical value associated with the additional reference IP address. The second shortest absolute distance can be greater than the shortest absolute distance. The device can determine whether the particular IP address and the additional reference IP address have a same subnet allocation. Responsive to a determination that the particular IP address and the additional reference IP address have the same subnet allocation, the device can determine that the ownership assignment of the particular IP address is the same as the ownership assignment of the additional reference IP address. Further, the process of determining additional reference IP addresses and the determining the subnet allocations can be repeated until a reference IP having the same subnet allocation as the particular IP address is found.

Table 1 below provides exemplary assignment data determined by the processes 300. The first column includes a set of unassigned IP addresses and the second column includes the date and time of the last observation of the unassigned IP addresses (e.g., when was the IP address last used). The third column includes a subnet allocation of the unassigned IP addresses. The fourth column includes a reference IP for each of the unassigned IP addresses, where the reference IPs are from a set of assigned IP addresses and have the same subnet allocation as their respective unassigned IP addresses. The last column includes an assignment group for each of the unassigned IP addresses that is determined based on the respective reference IP addresses in the fourth column.

TABLE 1

Exemplary assignment data

| Unassigned IP addresses | Last Observed | Subnet | Reference IP | Assignment Group |
|---|---|---|---|---|
| 10.145.116.68 | 2024 May 8 05:09:17 | 10.145.116.0/24 | 10.145.116.66 | Team 1 |
| 10.145.122.16 | 2024 May 8 05:09:02 | 10.145.122.0/26 | 10.145.122.15 | Team 2 |
| 10.147.194.131 | 2024 May 8 05:16:16 | 10.147.194.128/26 | 10.147.194.132 | Team 2 |
| 10.195.5.138 | 2024 May 8 05:15:51 | 10.195.5.128/27 | 10.195.5.136 | Team 2 |
| 10.178.108.31 | 2024 May 7 06:05:05 | 10.178.108.0/26 | 10.178.108.29 | Team 3 |
| 10.178.108.85 | 2024 May 8 05:33:38 | 10.178.108.64/26 | 10.178.108.93 | Team 4 |
| 10.178.108.86 | 2024 May 8 05:33:38 | 10.178.108.64/26 | 10.178.108.93 | Team 4 |
| 10.178.108.87 | 2024 May 8 05:33:38 | 10.178.108.64/26 | 10.178.108.93 | Team 4 |
| 10.178.108.124 | 2024 May 8 05:33:38 | 10.178.108.64/26 | 10.178.108.93 | Team 4 |
| 10.174.79.91 | 2024 May 3 07:01:45 | 10.174.79.64/26 | 10.174.79.108 | Team 5 |
| 10.174.133.249 | 2024 May 8 05:48:54 | 10.174.133.0/24 | 10.174.133.37 | Team 5 |
| 10.174.133.250 | 2024 May 8 05:48:54 | 10.174.133.0/24 | 10.174.133.37 | Team 5 |
| 10.174.133.251 | 2024 May 8 05:48:54 | 10.174.133.0/24 | 10.174.133.37 | Team 5 |
| 10.174.133.252 | 2024 May 8 05:48:54 | 10.174.133.0/24 | 10.174.133.37 | Team 5 |
| 10.174.133.253 | 2024 May 8 05:48:54 | 10.174.133.0/24 | 10.174.133.37 | Team 5 |
| 10.178.6.4 | 2024 May 8 05:34:38 | 10.178.6.0/23 | 10.178.6.20 | Team 6 |
| 10.178.6.5 | 2024 May 8 05:34:38 | 10.178.6.0/23 | 10.178.6.20 | Team 6 |
| 10.178.6.12 | 2024 May 8 05:34:38 | 10.178.6.0/23 | 10.178.6.20 | Team 6 |
| 10.178.6.13 | 2024 May 8 05:34:38 | 10.178.6.0/23 | 10.178.6.20 | Team 6 |
| 10.178.6.21 | 2024 May 8 05:34:38 | 10.178.6.0/23 | 10.178.6.20 | Team 6 |
| 10.178.6.22 | 2024 May 7 06:31:15 | 10.178.6.0/23 | 10.178.6.20 | Team 6 |

Computer System

Figure 4:
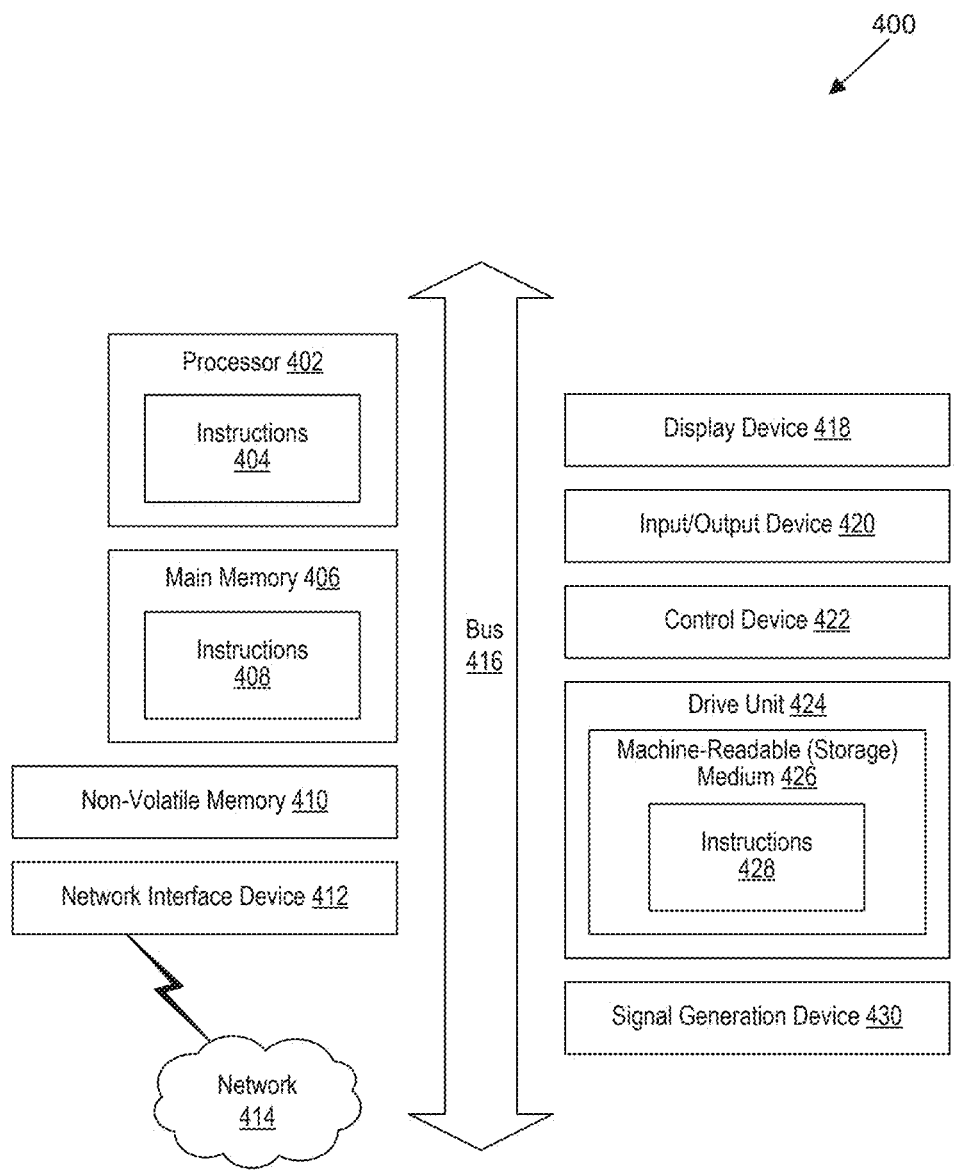
FIG. 4 is a block diagram that illustrates an example of a computer system in which at least some operations described herein can be implemented.

FIG. 4 is a block diagram that illustrates an example of a computer system 400 (or a computer device) in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for discovering ownership assignment of computer devices associated with a telecommunications network, the method comprising:
   obtaining a set of unassigned internet protocol (IP) addresses for ownership assignment discovery, wherein each IP address in the set of unassigned IP addresses is associated with a computer device of multiple computer devices on the telecommunications network,
wherein each IP address in the set of unassigned IP addresses is from a sequence of IP addresses associated with an organization,
wherein the multiple computer devices are assigned to multiple teams of the organization such that each team in the multiple teams is assigned to a segment of the sequence of IP addresses, and
wherein the ownership assignment of the set of IP addresses is unknown;
converting each IP address in the set of unassigned IP addresses into a numerical value representative of the respective IP address;
obtaining a set of assigned IP addresses from an assigned IP address database, wherein the ownership assignment of the set of assigned IP addresses is known;
obtaining a subnet allocation for each IP address in the set of assigned IP addresses from a subnet allocation database; and
for a particular IP address of the set of unassigned IP addresses,
  determining a reference IP address from the set of assigned IP addresses by determining a shortest absolute distance between a numerical value associated with the particular IP address and a numerical value associated with the reference IP address;
  determining whether the particular IP address and the reference IP address have a same subnet allocation; and
  responsive to a determination that the particular IP address and the reference IP address have the same subnet allocation, determining that the ownership assignment of the particular IP address is the same as the ownership assignment of the reference IP address.

2. The method of claim 1, further comprising:
responsive to determining the ownership assignment of the particular IP address, determining that a computer device of the multiple computer devices is assigned to a same team of the organization as the reference IP address.

3. The method of claim 1, further comprising:
responsive to determining the ownership assignment of the particular IP address, storing the assigned ownership assignment and the particular IP address to the assigned IP address database.

4. The method of claim 1, further comprising:
responsive to a determination that the particular IP address and the reference IP address do not have the same subnet allocation,
  determining an additional reference IP address from the set of assigned IP addresses by determining a second shortest absolute distance between the numerical value associated with the particular IP address and a numerical value associated with the additional reference IP address, wherein the second shortest absolute distance is greater than the shortest absolute distance;
  determining whether the particular IP address and the additional reference IP address have a same subnet allocation; and
  responsive to a determination that the particular IP address and the additional reference IP address have the same subnet allocation, determining that the ownership assignment of the particular IP address is the same as the ownership assignment of the additional reference IP address.

5. The method of claim 1, wherein converting each IP address in the set of unassigned IP addresses into a numerical value includes:
  converting each of the IP addresses into a binary representation;
  concatenating the binary representation into a binary string; and
  converting the binary string into the numerical value.

6. The method of claim 1,
wherein the subnet allocation database stores ownership information for the IP addresses associated with the telecommunications network, and
wherein the subnet allocation is based on segments of the sequence of IP addresses assigned to the multiple teams.

7. The method of claim 1, wherein obtaining the subnet allocation for each IP address in the set of assigned IP addresses comprises:
  determining a subnet mask for each of the IP addresses based on a network class or a network scheme associated with the telecommunications network; and
  determining a subnet for each of the IP addresses based on the determined subnet mask and the respective IP address.

8. The method of claim 1, wherein determining whether the particular IP address and the reference IP address have the same subnet allocation comprises:
  determining a subnet mask for the particular IP address based on a network class or a network scheme associated with the telecommunications network; and
  determining a subnet for the particular IP address based on the determined subnet mask and the particular IP address.

9. The method of claim 1,
wherein each IP address in the set of unassigned IP addresses is associated with at least one application programming interface of a respective computer device of the multiple computer devices on the telecommunications network.

10. The method of claim 1,
wherein the multiple computer devices include electronic devices, server devices, and/or cloud servers in communication with the telecommunications network.

11. A computer-implemented method for discovering ownership assignment of computer devices associated with a telecommunications network, the method comprising:
  obtaining a set of unassigned internet protocol (IP) addresses for ownership assignment discovery,
    wherein each IP address in the set of unassigned IP addresses is associated with a computer device of multiple computer devices on the telecommunications network, and
    wherein each IP address in the set of unassigned IP addresses is from a sequence of IP addresses associated with an organization;
  converting each IP address in the set of unassigned IP addresses into a numerical value representative of the respective IP address;
  obtaining a set of assigned IP addresses from an assigned IP address database;
  obtaining a subnet allocation for each IP address in the set of assigned IP addresses from a subnet allocation database; and for a particular IP address of the set of unassigned IP addresses,
  determining a reference IP address from the set of assigned IP addresses based on a numerical value associated with the particular IP address and a numerical value associated with the reference IP address;
  determining whether the particular IP address and the reference IP address have a same subnet allocation; and
  responsive to a determination that the particular IP address and the reference IP address have the same subnet allocation, determining that the ownership assignment of the particular IP address is the same as the ownership assignment of the reference IP address.

12. The method of claim 11, further comprising:
responsive to determining the ownership assignment of the particular IP address, determining that a computer device of the multiple computer devices is assigned to a same team of the organization as the reference IP address.

13. The method of claim 11, further comprising:
responsive to determining the ownership assignment of the particular IP address, storing the assigned ownership assignment and the particular IP address to the assigned IP address database.

14. The method of claim 11, further comprising:
responsive to a determination that the particular IP address and the reference IP address do not have the same subnet allocation,
  determining an additional reference IP address from the set of assigned IP addresses by determining a second shortest absolute distance between the numerical value associated with the particular IP address and a numerical value associated with the additional reference IP address, wherein the second shortest absolute distance is greater than the shortest absolute distance;
  determining whether the particular IP address and the additional reference IP address have a same subnet allocation; and
  responsive to a determination that the particular IP address and the additional reference IP address have the same subnet allocation, determining that the ownership assignment of the particular IP address is the same as the ownership assignment of the additional reference IP address.

15. The method of claim 11, wherein converting each IP address in the set of unassigned IP addresses into a numerical value includes:
  converting each of the IP addresses into a binary representation;
  concatenating the binary representation into a binary string; and
  converting the binary string into the numerical.

16. A non-transitory, computer-readable storage medium comprising instructions recorded thereon, wherein the instructions, when executed by at least one data processor of a device, cause the device to:
  obtain a set of unassigned internet protocol (IP) addresses for ownership assignment discovery,
    wherein each IP address in the set of unassigned IP addresses is associated with a computer device of multiple computer devices on a telecommunications network, and
    wherein each IP address in the set of unassigned IP addresses is from a sequence of IP addresses associated with an organization;
  convert each IP address in the set of unassigned IP addresses into a numerical value representative of the respective IP address;
  obtain a set of assigned IP addresses from an assigned IP address database;
  obtain a subnet allocation for each IP address in the set of assigned IP addresses from a subnet allocation database; and
  for a particular IP address of the set of unassigned IP addresses,
    determine a reference IP address from the set of assigned IP addresses based on a numerical value associated with the particular IP address and a numerical value associated with the reference IP address;
    determine whether the particular IP address and the reference IP address have a same subnet allocation; and
    responsive to a determination that the particular IP address and the reference IP address have the same subnet allocation, determine that the ownership assignment of the particular IP address is the same as the ownership assignment of the reference IP address.

17. The non-transitory, computer-readable storage medium of claim 16, wherein the device is further caused to:
responsive to determining the ownership assignment of the particular IP address, determine that a computer device of the multiple computer devices is assigned to a same team of the organization as the reference IP address.

18. The non-transitory, computer-readable storage medium of claim 16, wherein the device is further caused to:
responsive to determining the ownership assignment of the particular IP address, store the assigned ownership assignment and the particular IP address to the assigned IP address database.

19. The non-transitory, computer-readable storage medium of claim 16, wherein the device is further caused to:
responsive to a determination that the particular IP address and the reference IP address do not have the same subnet allocation,
  determine an additional reference IP address from the set of assigned IP addresses by determining a second shortest absolute distance between the numerical value associated with the particular IP address and a numerical value associated with the additional reference IP address, wherein the second shortest absolute distance is greater than the shortest absolute distance;
  determine whether the particular IP address and the additional reference IP address have a same subnet allocation; and
  responsive to a determination that the particular IP address and the additional reference IP address have the same subnet allocation, determine that the ownership assignment of the particular IP address is the same as the ownership assignment of the additional reference IP address.

20. The non-transitory, computer-readable storage medium of claim 16, wherein converting each IP address in the set of unassigned IP addresses into a numerical value includes:

converting each of the IP addresses into a binary representation;
concatenating the binary representation into a binary string; and
converting the binary string into the numerical.

\* \* \* \* \*